Oct. 25, 1966  H. G. REUTHER  3,280,743
DIRECTIONAL CONTROL OF EXPLOSIVE ENERGY
Filed May 10, 1963  5 Sheets-Sheet 1

INVENTOR
Hubert G. Reuther

BY Birch and O'Brien
ATTORNEYS

Oct. 25, 1966 H. G. REUTHER 3,280,743
DIRECTIONAL CONTROL OF EXPLOSIVE ENERGY
Filed May 10, 1963 5 Sheets-Sheet 3
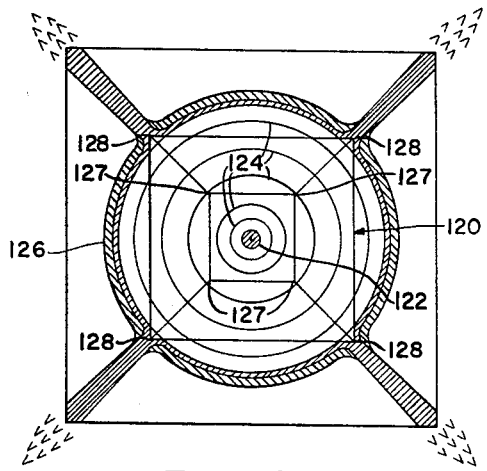
FIG.28.
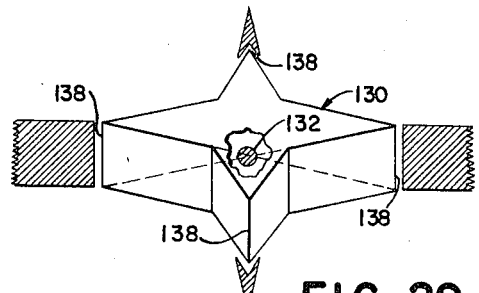
FIG.29.
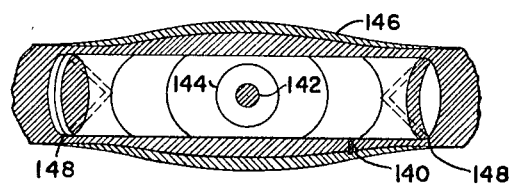
FIG.30.
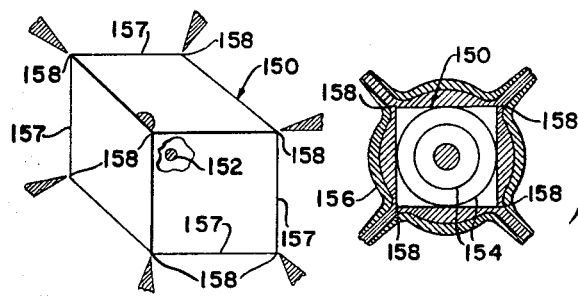
FIG.31. FIG.32.
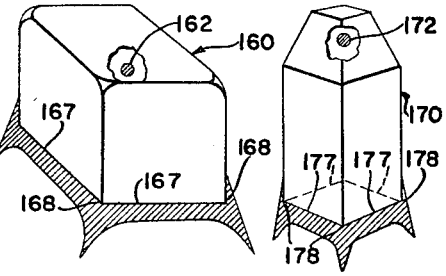
FIG.33. FIG.34.
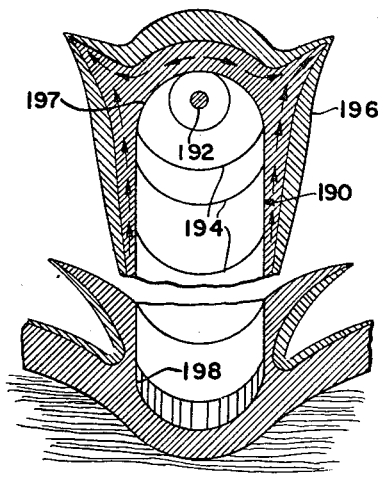
FIG.37.
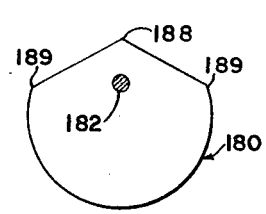
FIG.35.
FIG.36.
INVENTOR
Hubert G. Reuther
BY *Birch and O'Brien*
ATTORNEYS Oct. 25, 1966    H. G. REUTHER    3,280,743
DIRECTIONAL CONTROL OF EXPLOSIVE ENERGY
Filed May 10, 1963    5 Sheets-Sheet 4

INVENTOR
Hubert G. Reuther

BY  Birch and O'Brien
ATTORNEYS

INVENTOR
Hubert G. Reuther

BY Birch and O'Brien

ATTORNEYS

United States Patent Office 3,280,743
Patented Oct. 25, 1966

3,280,743
DIRECTIONAL CONTROL OF
EXPLOSIVE ENERGY
Hubert G. Reuther, 1429–A Akamai St.,
Kailua, Oahu, Hawaii
Filed May 10, 1963, Ser. No. 279,401
2 Claims. (Cl. 102—24)

The present invention relates to explosives and more particularly to devices which control the energy released by a detonated explosive so that such energy may be utilized with maximum efficiency.

It has long been a problem in the explosives art that the results could not be definitely predicted with regard to the detonation of explosives having various shapes and sizes. Of course, it is known that certain shaped explosives reacted in a certain manner but the definite results were somewhat uncertain and were accompanied with such variances between identical shapes as to be unpredictable. Because of unpredictable results, the majority of the potential energy released by an explosive mass was wasted. Even with shaped charges of conventional nature, the released energy was not controlled with regard to direction so that an inefficient mass of large size was necessary to perform work which required only a small amount of energy.

It is, therefore, an object of this invention to control the energy released by an explosive mass.

Another object of this invention is to accomplish directional control of explosive energy.

This invention has another object in that the majority of the energy released by an explosive mass is utilized to perform work.

Another object of this invention is to predict the direction of energy released by an explosive mass.

Another object of this invention is to provide a particularly shaped mass of explosives with a selectively positioned point of detonation.

This invention has another object in that the point of initiation is selectively located in an explosive mass in accordance with the intersections of the exterior surfaces defining the mass.

A further object of this invention is to provide a particularly shaped mass of explosives with a point of initiation that is displaced from the center of such mass.

This invention has a further object in that the external surfaces of an explosive mass and the propagation of expanding energy from the detonating point in such mass define a particular relationship in accordance with the time element for the particular explosive, which relationship defines the path of the energy through such external surfaces.

In practicing the present invention, an explosive is confined within a shaped mass having a predetermined shaped surface and detonating means is operatively disposed within said mass to define a selected point of initiation from which gaseous energy upon detonation expands in spherical propagating lines of force that pierce the surface and produce a reactionary force for momentarily enveloping and restraining the energy. The reactionary force is greatest at those places on the surface which conform to the spherical propagating lines of force. With such an arrangement, the confined energy will penetrate the reactionary force at its most vulnerable point and will be released therethrough.

Other objects and advantages of the present invention will become apparent from the following description taken in connection with the accompanying drawings wherein:

In the drawings:

FIG. 28 is a schematic representation of FIG. 27 in an exploding condition;

FIG. 29 is a schematic representation of another form of the present invention;

FIG. 30 is a schematic representation of another form of the present invention;

FIG. 31 is a perspective view of another form of the present invention;

FIG. 32 is a schematic representation of FIG. 31 in an exploding condition;

FIG. 33 is a perspective view of a modification of FIG. 31;

FIG. 34 is a schematic representation of another form of the present invention;

FIG. 35 is an elevation view of another form of the present invention;

FIG. 36 is a schematic representation of FIG. 35 in an exploding condition;

FIG. 37 is a schematic representation of another form of the present invention;

Figure 1:
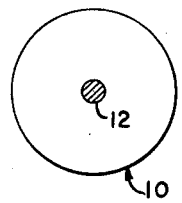
FIG. 1 is an elevation view of a spherical mass embodying the present invention.

It is known that energy from an explosion does not normally expand equally from the point of origin but radiates in high speed, streamlined projections which contain the destructive potential energy released by the explosive. My experiments have shown that the individual mass of every explosive has a characteristic all its own and I have discovered that such characteristic is determined by the shape of the mass, the angles defining such shape and the point of initiation of the detonation. Once the angles and shape of an explosive mass has been established, the characteristic may be varied by varying the point of initiation.

Upon detonation, a mass of explosives has a series of spherical propagating lines of force radiating equally in all directions from the point of initiation. The first spherical propagating lines of force to pierce (and the continued piercing) the outer surface of the mass forms a reactionary force which is determined by the concentration of the propagating lines of force to the outer surfaces of the shaped mass. If the shape of the mass thus penetrated conforms with the continuity of the spherical propagating lines of force, the reactionary forces will be prolonged.

By way of explanation of the reactionary force, it is a known fact that it takes time to overcome inertia whether it be a solid, liquid or gas, whereby any moving force traveling at greater than supersonic speed creates a solid resistance in the opposite direction of thrust and equal to its speed. By way of comparison, airplanes are known to travel at supersonic speeds, i.e., more than 1200 feet per second, while in high explosives, the rate of expansion is approximately 24,000 feet per second; thus, it is readily apparent that a terrific resistance or reactionary force is encountered. In accordance with experiments embodying the present invention, such a reactionary force is defined as being caused by momentarily solidifying the air compressibility into an absolute solid, sufficiently to retard the outward thrust of the potential energy confined in a high explosive; the more violent the action, which results in an equally violent reaction, the closer the reactionary forces will remain adjacent the explosive mass. The penetration of these reactionary forces by the potential energy, at the most vulnerable point in the duration period, governs the destiny of the directional forces of the potential energy confined in a high explosive. As long as the potential energy is confined and restricted within the reactionary forces, they are non-directional, and the initial penetration of these reactionary forces normally constitutes the major projection of the energy released therethrough. Once this penetration is accomplished, a greater portion of the volumetric energy will flow through the ever enlarging penetration thus formed.

The outer surface of a mass of explosives that conforms with the continuity of the spherical propagating lines of force (irrespective of their position on the outer surface of the mass) will begin expansion at right angles to the face. It should be noted that in theory, the internal, spherical propagating lines of force precede the enveloping reactionary forces.

Any surface on the outer mass of explosives that is tangent and bears a direct relation to the spherical propagating lines of force will begin its expansion outward, at right angles to the tangent (comparable to their lengths), at the point where the spherical propagating lines of force coincide with the tangent. If the outer surface of the mass of explosives is not tangent to the spherical propagating lines of force, the point of coincidence will receive the initial thrust of the confined energy of the high explosives. Such surface—from the point of coincidence—will travel in an arc scribed on a radius from a stationary pivot point which is the extremity of the mass of explosives, i.e., the point furthest from the point of initiation.

Opposing angles or intersecting surfaces of the mass that coincide at the apex of the internal angle condense and greatly magnify the intensity of the reactionary forces adjacent to the surfaces or angles offering resistance to the potential confined energy and the path of least resistance is over and around the reactionary forces thus formed, adjacent and between the opposing angles or surfaces. Accordingly, it is possible to achieve directional control of the major and minor projections radiating therefrom, by the penetration of the initial and subsequent reactionary forces, at the apex of the external angles, which offers the path of least resistance for the potential energy confined and restricted, by the enveloping reactionary forces, to the unpressurized atmosphere area (normal atmospheric pressure need not be considered). The degree of acuteness of these external angles, irrespective of their position or location from the point of initiation, is an important factor in achieving penetration of these reactionary forces and is to be considered when analyzing high explosives.

The element of time for exploding a mass is based upon the rate and the difference in rate of propagation of the lines of force. Some of the calculations for my experiments are based upon time computed as $\frac{1}{100,000}$ part of a second. The duration of the initial and subsequent reactionary forces is another factor to be considered when analyzing high explosives.

It is now apparent that by varying the point of initiation in relation to the surface angles and shapes of a mass of explosives, it is possible to control the concentration and dispersion of the potential energy of high explosives confined and restricted within the enveloping reactionary force. From the point of initiation of masses having various shapes and angles, by considering the spherical propagating lines of force and their relation to the outer surface of a particular mass, the element of time based on the rate of propagation, and the duration of the initial reactionary force and its penetration, it is possible to predict the major and minor projections radiating therefrom.

Figure 10:
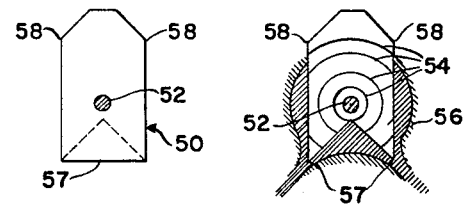
FIG. 10 is an elevation view of another form of the present invention.
Figure 11:
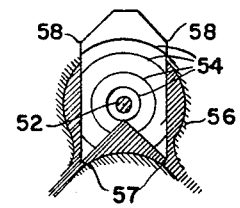
FIG. 11 is a schematic representation of FIG. 10 in an exploding condition.
Figure 12:
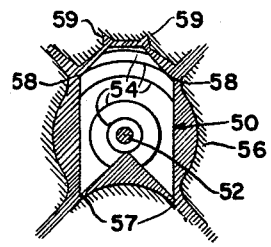
FIG. 12 is a schematic representation of FIG. 10 in a further exploding condition.

FIGS. 10, 11 and 12 illustrate another form of an explosive mass 50 in which an intermediate cylinder portion has a truncated conical portion on its upper end and its lower end is hollowed by a conical recess. The point of initiation 52 is located on the vertical axis of the mass 50 and is spaced just above the apex of the conical recess and just below the center of the cylinder portion. In FIG. 11, the spherical propagating lines of force 54 commence the formation of the reactionary force 56 and the first penetration by the confined energy is achieved at the lowermost part of the mass 50 where the surface intersection between the exterior surfaces of the cylinder and the conical recess define a circular apex 57. Accordingly, the first projection of the released energy has a conical configuration and is directed downwardly.

The surface intersection between the exterior surfaces of the cylinder and the truncated conical portion define an upper circular apex 58. As is illustrated in FIG. 12, the propagation continues and the enveloping reactionary force 56 is again penetrated at the surface intersection 58; this second projection of the released energy has a conical configuration and is directed upwardly. The two projections from the two surface intersections 57 and 58 are substantially equal in intensity because of the location of the point of initiation 52 so that each is considered a major projection. A minor projection of released energy in conical form is achieved at the surface intersection 59 which is defined by the circular intersection between the conical and horizontal surfaces formed by the truncated part of the conical portion.

Figure 13:
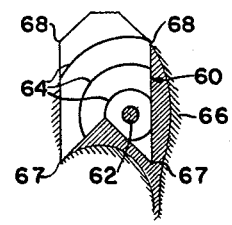
FIG. 13 is an elevation view of a modification of FIG. 10.
Figure 14:
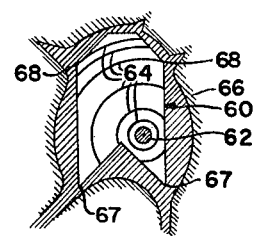
FIG. 14 is a schematic representation of FIG. 13 in an exploding condition.

FIGS. 13 and 14 illustrate an explosive mass 60 that is identical in shape to the mass 50 but differs therefrom in that the point of initiation 62 is displaced from the vertical axis toward the exterior wall of the cylinder portion so as to be positioned above a sloping wall of the conical recess. As the spherical propagating lines of force 64 emanate from the point of initiation 62, the reactionary force 66 is initially accumulated on the nearest surface of the cylinder portion and the first penetration occurs at the nearest part of the surface intersection 67 between the exterior surfaces of the cylinder and the conical recess. Since the surface apex 67 is circular, the first projection of the released energy has an elliptical configuration in elevation, i.e., the intensity of the first projection varies around the circle of apex 67 from a maximum at that part of apex 67 which is radially closest to the point of initiation 62 to a minimum or zero intensity at that part of apex 67 which is radially farthest from point of initiation 62.

As is shown in FIG. 14, the surface defining the conical recess, which is closest to the point of initiation 62, is at more right angles to the spherical propagating lines of force 64 and produces an enveloping reactionary force 66 of high desnsity and of a long duration period. The path of least resistance is over and around the reactionary force 66 and major projections of released energy occurs at those surfaces of the apex 67 and the apex 68 which are radially farthest from the point of initiation 62. The lower major projection has a maximum intensity at that point of surface apex 67 which is radially farthest from the point of initiation and decreases in intensity around the circumference of the circle defining apex 67 where it joins the first projection described above. Thus, the lower major projection is dispersed downwardly in the shape of a hollow oblique cone. The upper major projection at the surface intersection defining apex 68 has a maximum intensity at that point of surface apex 68 which is radially farthest from the point of initiation 62 and decreases in intensity around the circumference of apex 68 to that point which is radially closest to the point of initiation. Thus, the upper major projection is dispersed upwardly in the shape of an irregularly formed, inverted, hollow cone.

Figures 15, 16, 17, 18:
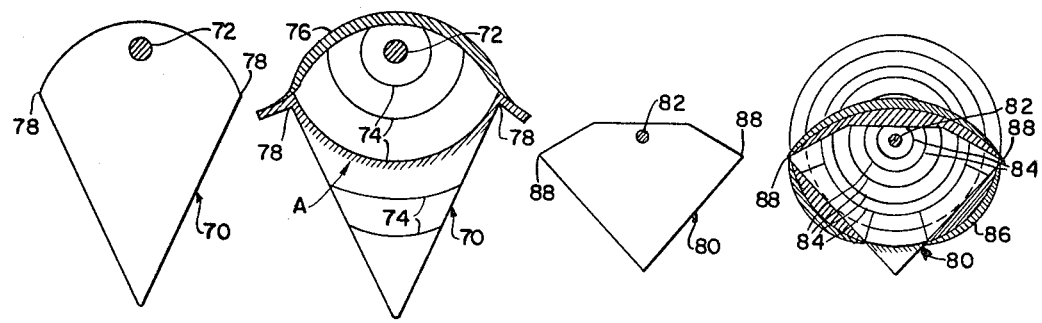
FIG. 15 is an elevation view of another form of the present invention.
FIG. 16 is a schematic representation of FIG. 15 in an exploding condition.
FIG. 17 is an elevation view of another form of the present invention.
FIG. 18 is a schematic representation of FIG. 17 in an exploding condition.

Another form of the present invention is illustrated in FIGS. 15 and 16 wherein an explosive mass 70 has an upper semi-spherical portion and a lower inverted conical portion. The point of initiation 72 is located on the vertical axis of the mass 70 and substantially in the center of the upper semi-spherical portion. Since the surface of the semi-spherical portion conforms to the spherical propagating lines of force 74, the reactionary force 76 has a larger magnitude on the top of the mass 70 as previously described in connection with the mass 30 in FIG. 7. The intersection between the surfaces of the semi-spherical portion and inverted conical portion of the mass 70 defines a surface apex 78 in the form of a circle. The confined energy penetrates the enveloping reactionary force 76 at its most vulnerable point in the duration period, which in this instance is the apex 78. The major projection of the energy is accordingly dispersed in the shape of a hollow cone and is directly downwardly relative to the mass 70.

Figures 19, 20, 21:
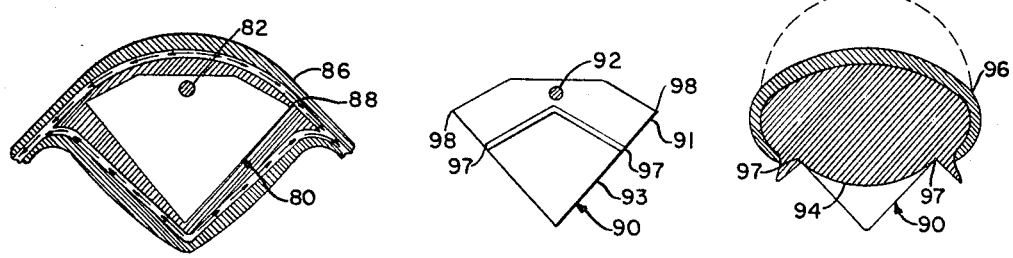
FIG. 19 is a schematic representation of FIG. 17 in a further exploding condition.
FIG. 20 is an elevation view of another form of the present invention.
FIG. 21 is a schematic representation of FIG. 20 in an exploding condition.

Another form of the present invention is illustrated in FIGS. 17, 18, and 19 wherein an explosive mass 80 includes an upper, truncated conical portion and a lower, inverted conical portion. The point of initiation 82 is located on the vertical axis of the mass 80 and centrally disposed in the upper truncated conical portion. The spherical propagating lines of force 84 emanating from the point of initiation 82 are shown in FIG. 18 with the initial accumulation of the reactionary force 86. The intersection between the surfaces of the upper and lower portions of the mass 80 define a surface apex 88 in the form of a circle. During the duration period of the enveloping reactionary force, its most vulnerable point is penetrated by the confined energy and the major projection occurs at surface apex 88. Accordingly, the energy follows the path of least resistance over and around the reactionary force, which is schematically illustrated by the arrows in FIGURE 19, and is dispersed downwardly from the mass 80 in the shape of a hollow cone.

Figures 22, 23, 24:
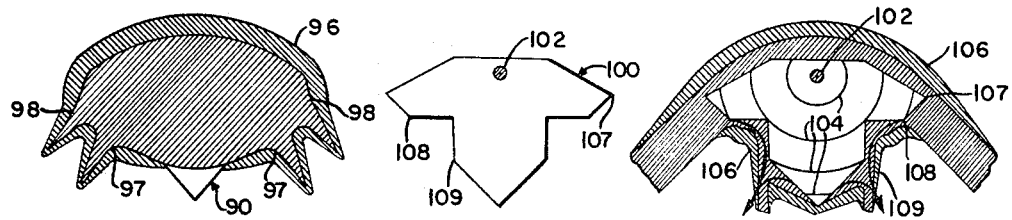
FIG. 22 is a schematic representation of FIG. 20 in a further exploding condition.
FIG. 23 is an elevation view of another form of the present invention.
FIG. 24 is a schematic representation of FIG. 23 in an exploding condition.

Another form of the present invention is illustrated in FIGURES 20, 21 and 22 wherein an explosive mass 90 has an exterior shape similar to that of FIGURE 17 described above. In this instance the interior construction of the upper and lower portions of the mass 90 are arranged for different explosive compositions. The upper portion 91 is arranged for a composition, such as pentolite, having a much higher rate of expansion than the lower portion 93 which is arranged for a composition having a relatively slower rate of expansion, such as amatol. In order that predetermined relative amounts of the two compositions may occupy suitable volumes, the lower portion 93 has an upper cone disposed in a mating conical recess in the upper portion 91.

The point of initiation 92 is located on the vertical axis of the mass 90 and centrally positioned within the upper portion 91. Upon initiation, the pentolite because of its higher rate of expansion commences the formation of the reactionary force. As the propagation of the spherical lines of force 94 continue, the reactionary force 96 is first penetrated at the surface apex 97 which defines the circular intersection between the adjoining exterior surfaces of the upper pentolite portion 91 and the lower amatol portion 93 (FIGURE 21). The enveloping reactionary force 96 is next penetrated at the surface apex 98 which is the apex of the angle defining the circumferential intersection of adjoining surfaces of the upper portion 91. Accordingly, the potential energy is released in twin projections of equal intensity and is dispersed downwardly in the shape of an inner hollow cone encircled by a larger outer hollow cone.

Figure 2:
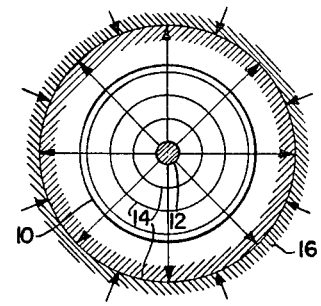
FIG. 2 is a schematic representation of the mass of FIG. 1 in an exploding condition.

FIGURES 23 and 24 illustrate another form of the present invention wherein an explosive mass 100 has an exterior surface similar to that of FIGURE 17 but with a part thereof removed. The upper portion of mass 100 is a truncated cone having a base registering with the base of the inverted cone forming the lower portion. The intermediate part of the lower portion of mass 100 includes a cylindrical part disposed about the vertical axis The underlying principle of directional control of the energy released by an explosive will be more clearly understood in connection with the following description of specific examples. As is illustrated in FIG. 1, a mass of explosives has the shape of a sphere 10 and its detonator is centrally positioned therein to define the point of initiation 12. In order to show the characteristic of the explosive mass, FIG. 2 is scribed with a series of enlarging concentric spherical circles 14 which represent spherical propagating lines of force radiating equally in all directions from the point of initiation 12. The spherical propagating lines of force 14 illustrate the potential energy of the gases released by the exploded mass. Upon initiation of the mass 10 at the center 12, the spherical propagating lines of force 14 will radiate therefrom and will pierce the surface of the mass 10, coinciding on the outer surface of mass 10 and simultaneously expanding into and forming an initial reactionary force 16 which completely envelopes the initiated mass of explosives. In FIG. 2, the largest of the spheres 14 is shown with a peripheral cross-hatching to illustrate the smaller spheres but it should be understood that such peripheral cross-hatching throughout the drawings is intended as a complete cross-hatching from the initiation point; thus the outer sphere 14 is a volume representing the potential energy confined by the enveloping ractionary force 16. From FIG. 2, the radiation of the propagating lines of force 14 and the reactionary force 16 continues so that they expand spherically into larger spheres shown in FIG. 3, from which position the reactionary force will commence to dissipate and a pressure wave will be formed.

Figure 3:
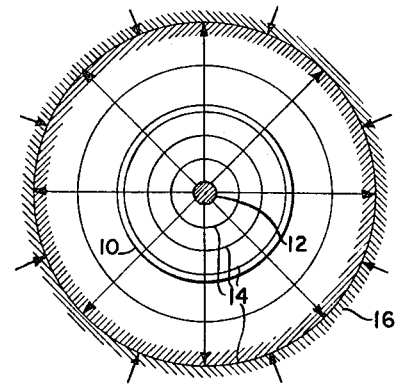
FIG. 3 is a schematic representation of a further progressed condition of FIG. 2.

The difference in the outer spheres between FIG. 2 and FIG. 3 represent a schematic illustration of the duration period of the initial reactionary force. As described above, the major and minor projections of the confined energy to penetrate the reactionary force are achieved in the duration period and the directions of such projections are dependent upon the concentration of the propagating lines of force 14. Since the shape of the mass 10 in FIGS. 1, 2, and 3 is a sphere, there are no external surface angles which would interfere with the spherical propagation of the potential energy; consequently, the propagating lines of force are not concentrated but radiate equally in all directions from the point of initiation 12 so that the reactionary force 16 has a spherical configuration which restrains the potential energy equally in all directions opposite the propagating lines of force 14. With such a spherical arrangement, the projections of the confined energy are equal in all directions and upon expiration of the duration period, the reactionary force will commence to dissipate whereupon the confined energy will be released in all directions.

Figure 4:
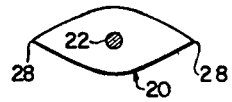
FIG. 4 is an elevation view of another form of the present invention.
Figure 5:
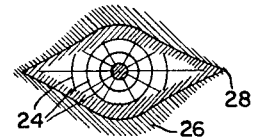
FIG. 5 is a schematic representation of FIG. 4 in an exploding condition.

FIGS. 4 and 5 illustrate an explosive mass 20 having a centrally located point of initiation 22 and having an exterior shape which generally conforms to the shape of an ellipsoid, i.e., substantially circular in plan view and substantially elliptic in elevation view. The upper and lower portions of the mass 20 are identically shaped and are joined in a circular horizontal plane which defines the major axis of the shape 20. The external, opposing surfaces of such upper and lower portions are joined at an angle which has an apex 28 defined by the horizontal plane of the major axis. The minor axis of the shape 20 is defined by a circular vertical plane centrally intersecting the major axis.

The point of initiation 22 is located at the intersection of the major and minor axis and upon initiation propagating lines of force 24 will expand radially therefrom in all directions to pierce the outer surface of the mass 20. As is illustrated in FIG. 2, the upper and lower opposing surfaces of the ellipsoid 20 are closest to the point of initiation 22 at the center of the minor axis and propagation of the confined energy will first reach such surfaces and then progress to the apex 28 of the angle joining such surfaces. The initial reactionary force 26 has a greater magnitude atop and beneath the ellipsoid 20 where such surfaces are tangent to the spherical propagating lines of force 24; the magnitude of the reactionary force decreases to a lesser value at the apex 28 of the angle between such surfaces. As long as the gases are confined within the enveloping reactionary force 26, they are non-directional the first penetration of the reactionary force is achieved at the apex 28 to form the major projection. Once the major projection is accomplished, a greater portion of the confined energy will escape through the opening thus formed. With the particular shape of the ellipsoid 20, the confined energy will be released in the form of a circle since the apex 28 is circular in defining the intersection of adjacent geometric surfaces of the mass 20.

Figure 6:
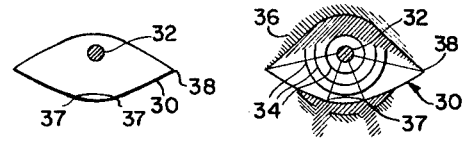
FIG. 6 is an elevation view of a modification of FIG. 4.
Figure 7:
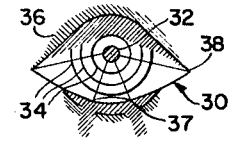
FIG. 7 is a schematic representation of FIG. 6 in an exploding condition.

A modification of FIG. 4 is illustrated in FIGS. 6 and 7 in which the explosive mass 30 has a similar shape as the mass 20 but a different location for the point of initiation 32. In this instance, the point of initiation 32 is centrally located with respect to the major axis but is displaced vertically on the minor axis so as to be centrally above the intersection of the planes defining the major and minor axes. With such an arrangement, the spherical propagating lines of force 34 are more concentrated at the top surface of the mass 32 than at lower surface thereof whereby the initial reactionary force 36 has a greater magnitude on the top surface than on the lower surface.

While the mass 30 has been generally referred to as an ellipsoid, it should be noted that the upper and lower surfaces each have a geometric configuration including an arcuate dome portion and a truncated cone portion; the intersection 37 between the external surfaces of such portions is circular and in a parallel plane spaced from the horizontal plane of the major axis. The upper and lower surfaces of mass 30 intersect in the horizontal plane of the major axis to define a surface intersection 38. Considering each surface intersections 37 and 38 as the apex of an external angle between adjacent surfaces, the apex 38 is more acute than the apex 37. As is illustrated in FIG. 7, the reactionary force 36 is penetrated at apex 37 and apex 38 to form a major projection for released energy at apex 37 and a minor projection at apex 38. The major projection will be in the form of a hollow cone having a vertical axis and the minor projection will be in circular or annular form emanating from apex 38.

From the description so far, it is apparent that by increasing the intersecting surfaces of an explosive mass, the energy released by detonation will be dispersed in a number of directions in accordance with the number of intersecting surfaces. Furthermore, by selectively positioning the point of initiation in the mass, the spherical propagating lines of force emanating therefrom will coincide with more surface tangents on certain surfaces than on other surfaces whereby penetration of the reactionary force by the confined energy is accomplished to control the direction of the released energy in a predetermined dispersion pattern. Additional forms of the present invention may be utilized to obtain various dispersion patterns as will become apparent from the following descriptions of such forms.

Figure 8:
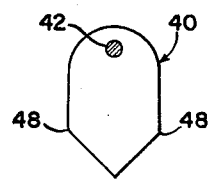
FIG. 8 is an elevation view of another form of the present invention.
Figure 9:
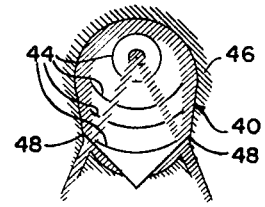
FIG. 9 is a schematic representation of FIG. 8 in an exploding condition.

FIGS. 8 and 9 illustrate an explosive mass 40 having a semi-spherical top portion, an intermediate cylinder portion and a lower inverted conical portion. The point of initiation 42 is located in the center of the semi-spherical top portion on the vertical axis of the mass 40. Since the exterior surface of the upper part of mass 40 more closely conforms to the spherical propagating lines of force 44, the reactionary force 46 will be of longer duration at the top than at the bottom of mass 40. The surface intersection between the cylinder portion and the inverted conical portion defines a circular apex 48 where penetration of the reactionary force 46 is achieved before the major projection of the released energy. In this instance the major projection of the released energy has a conical configuration and is directed downwardly.

of the mass 100 and an adjoining annular shoulder part disposed in a plane transverse to the vertical axis. The point of initiation 102 is located on the vertical axis and centrally disposed in the upper portion of the mass. The intersection between the surfaces of the upper and lower portions of the mass 100 define a surface apex 107 in the form of a circle. The intersection between the adjoining surfaces of the horizontal shoulder part and the cone of the lower portion define a second surface apex 108 in the form of a circle. The intersection between the adjoining surfaces of the cylindrical part and the cone of the lower portion define a second surface apex 109 in the form of a circle.

As is shown in FIGURE 24, the spherical propagating lines of force 104 establish the enveloping reactionary force 106 which is most vulnerable at the surface apex 107 and the surface apex 108. The confined energy which penetrates the reactionary force 106 at apex 107 and apex 108, is joined to form a single major projection therefrom. The confined energy also penetrates the reactionary force 106 at the surface apex 109 to form a minor projection therefrom. Accordingly, the potential energy is released in two concentric projections and is dispersed downwardly in the shape of inner and outer cones with the outer cone being of greater intensity.

Figures 25, 26, 27:
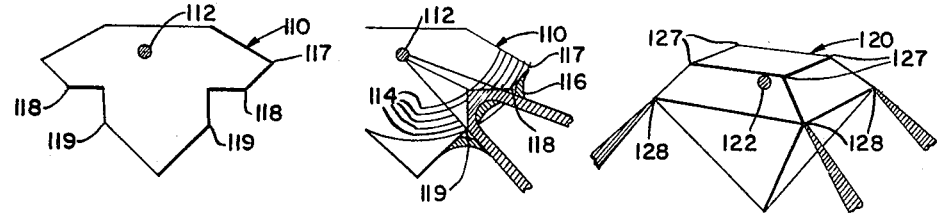
FIG. 25 is an elevation view of a modification of FIG. 23.
FIG. 26 is a schematic representation of FIG. 25 in an exploding condition.
FIG. 27 is an elevation view of another form of the present invention.

FIGURES 25 and 26 illustrate a modification of FIGURE 23 in which an explosive mass 110 has the same configuration as the mass 100 but differs therefrom in that the point of initiation 112 is offset from the vertical axis of the mass 110 and is displaced farther from the frustrum surface of the upper portion. As viewed in FIGURE 26, that part of the lower horizontal shoulder part which is radially fartherest from the point of initiation 112, is at more right angles or more tangent to the spherical propagating lines of force 114 than the correspindinlgy radially fartherest port of the cylinder of the lower portion. Thus, the reactionary force 116 is most vulnerable at the surface apex 119 from which the potential energy is released in a major projection. Penetration of the reactionary force 116 is next achieved at the surface apex 118 from which the potential energy is released in a minor projection. The major and minor projections vary in intensity from a maximum at the radially fartherest point of the apex 119 and the apex 118, respectively, from the point of initiation 112 to a minimum at the radially nearest point thereof. Accordingly, the potential energy is released in a pair of spaced projections and is dispersed downwardly and outwardly in the shape of inner and outer arcuate formation.

Another form of the present invention is illustrated in FIGURES 27 and 28 wherein an explosive mass 120 is a polyhedron having nine plane faces. The mass 120 is formed from a lower, inverted pyramidal portion having its base in registry with the base of an upper, truncated pyramidal portion. The point of initiation 122 is located on the vertical axis of the mass 120 and centrally located in the upper portion thereof. The surface intersection between adjacent surfaces of the upper and lower portions of the mass 120 is in the form of a square rather than a circle as described in the previous modifications. Since the square itself includes four intersections, the mass 120 is provided with four apexes 128, one at each corner of the square. In addition, the four corners of the perimeter defined by truncated plane of the upper portion of the mass 120, provide four more apexes 127.

The spherical propagating lines of force 124 establish the enveloping reactionary force 126 which has four equally vulnerable joints adjacent the four apexes 128. Upon penetration of the reactionary force 126, the potenial energy is released in four equal major projections and is dispersed downwardly and outwardly relative to the mass 120. A second penetration of the reactionary force 126 is achieved during its duration period at the four apexes 127. Thus the potential energy is also released in four equal minor projections and is dispersed upwardly and outwardly relative to the mass 120.

FIGURE 29 illustrates another form of the present invention utilizing a plurality of non-continuous surfaces. In this instance an explosive mass 130 has a plan view configuration of a four pointed star formed by a center, cube portion having four of its faces in registry with the respective bases of four triangular prism portions. The point of initiation 132 is centrally located in the mass 130. The apex of each triangular prism portion defines the intersection of adjoining prism surfaces; thus the four surface intersections provide four apexes 138 equally spaced from the point of initiation 132. With such an arrangement, the potential energy is released in four equal projections and is dispersed horizontally relative to the four pointed mass 130.

FIGURE 30 illustrates another form of the present invention utilizing an explosive mass 140 having a cylindrical shape with convex end portions. The point of initiation 142 is centrally located along the longitudinal axis of the cylindrical mass 140. The convex end portions of the mass 140 define a pair of surface intersections 148 being in the form of circles and being equally spaced from the point of initiation 142. With such an arrangement, the spherical propagating lines of force 144 establish the reactionary force 146 which is equally vulnerable adjacent the two end apexes 148. Thus, the potential energy is released in two equal projections and is dispersed in annular shapes relative to the longitudinal axis of the mass 140.

Another form of the present invention is illustrated in FIGURES 31 and 32 in which an explosive mass 150 has the shape of a cube and the point of initiation 152 is centrally located therein. The eight corners of the cube mass 150 provides eight surface apexes 158 equally spaced from the point of initiation 152. The spherical propagating lines of force 154 establish the enveloping reactionary force 156 which is equally vulnerable adjacent the eight apexes 158. The confined energy is thus released in eight equal major projections and is dispersed in line fashion in eight different directions defined by radii from the point of initiation 152 through the eight apexes 158. The twelve edges between adjoining surfaces of the cube mass 150 provides twelve apexes 157 adjacent which the potential energy is released in twelve minor projections during the duration period of the reactionary force 156.

FIGURE 33 is a modified form of the cube mass of FIGURE 31 in that the cube mass 160 has its point of initiation 162 raised on the vertical axis of the mass so as to be slightly below the top surface of the mass 160. In addition the four top corners of the cube mass 160 are rounded and only the four bottom corners provide surface apexes 168 which are equally spaced from the point of initiation 162; the four bottom edges joining the corner apexes 168 define a second set of apexes 167. Accordingly, the reactionary force is penetrated by four equal major projections adjacent the corner apexes 168 to disperse the potential energy in line fashion in four different directions defined by radii from the point of initiation 162 through the four apexes 168. Potential energy is also released adjacent the edge apexes 167 in four equal minor projections that join with the major projections to define a dispersion pattern in the form of a hollow square with an enlargement at the four corners of such square.

Another form of the present invention is illustrated in FIGURE 34 in which an explosive mass 170 has an upper portion in the form of a truncated pyramid. The base of the upper truncated pyramid is in registry with the top surface of a cubical lower portion, the lower surface of which is defined by a pyramidal recess. The point of initiation 172 is disposed on the vertical axis of the mass 170 is centrally located in the upper truncated pyramid portion. The four intersecting edges between the adjoining exterior surfaces of the cubical lower portion and those of the pyramidal recess define four corner apexes 178 joined by four edge apexes 177. With such an arrangement the potential energy is released in four equal major projections adjacent the four corner apexes 178, which are joined by four equal minor projections adjacent the four edge apexes 177. The released energy is accordingly dispersed downwardly in the form of a square having a slight enlargement at each of the four corners of such square.

FIGURES 35 and 36 illustrate another form of the present invention in that an explosive mass 180 has an upper conical portion the base of which is in registry with the flat surface of a truncated sphere that is larger than a hemisphere. The point of initiation 182 is located on the vertical axis of the mass 180 and is disposed in the upper conical portion just above the base thereof. The spherical propagating line of force 184 emanating from the point of initiation 182, establish the enveloping reactionary force 186. The apex of the upper conical portion defines an intersecting surface apex 188 and the surface intersection between the upper and lower portions of the mass 180 define a second apex 189 in the form of a circle. Potential energy is released in a major projection adjacent the apex 188 and in a minor projection adjacent the circular apex 189. The released energy is accordingly dispersed axially upwardly in a projection of high intensity from the major projection and conically upwardly in a conical projection of low intensity from the minor projection.

FIGURE 37 illustrates another form of the present invention with respect to a cylindrically shaped bomb that is detonated after penetration of the terrain. An explosive mass 190 includes a cylinder with opposite hemispherical end portions having the point of initiation 192 located on the longitudinal axis of the mass and centrally disposed in the upper hemispherical portion. The spherical propagating lines of force 194 establish the enveloping reactionary force 196, a part of which is defined by the surrounding terrain adjacent the embedded end of the bomb. The surface intersections between the cylinder and its two end portions define upper and lower apexes 197 and 198 in the form of circles. The confined energy is released adjacent the lower apex 198 and coincides with the expanding lower side walls of the bomb cylinder to form a major projection whereby the energy is dispersed radially from the longitudinal axis of the mass 190 along the top of the terrain. A minor projection is formed adjacent the top apex 197 and the release of energy along the path of least resistance as shown by the arrows forms a conical dispersion pattern.

Figures 38, 39, 40:
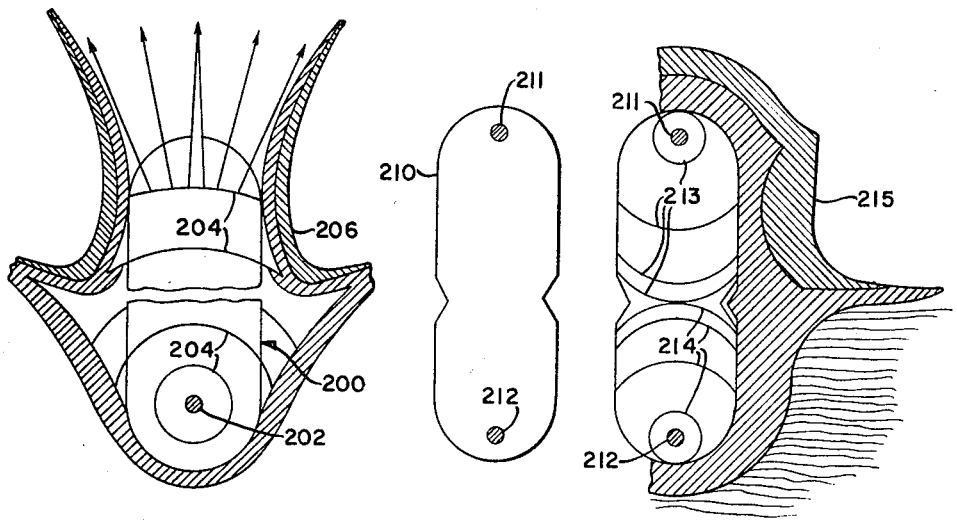
FIG. 38 is a schematic representation of a modification of FIG. 37.
FIG. 39 is an elevation view of another form of the present invention.
FIG. 40 is a schematic representation of FIG. 39 in an exploding condition.

FIGURE 38 illustrates a modification of FIGURE 37 in that the same type of bomb has a point of initiation 202 located on the longitudinal axis of the explosive mass 200 and centrally disposed in the lower hemispherical portion. Upon detonation of the bomb after penetration of the terrain, the spherical propagating lines of force 204 establish the reactionary force 206 which together with the terrain confines the potential energy. The detonation causes a large crater and the potential energy is released in a projection along the top of the terrain. Since the length of the mass 200 is out of proportion to and larger than its diameter, the confined energy is released upwardly in a major projection and dispersed upwardly in a hemispherical pattern.

Another form of the present invention is illustrated in FIGURES 39 and 40 wherein a cylindrically shaped bomb is synchronously detonated at its top and bottom. In this instance an explosive mass 210 has a cylinder portion and hemispherical end portions with points of initiation therein. The points of initiation 211 and 212 are located on the longitudinal axis of the mass 210 and centrally positioned in the upper and lower hemispherical portions, respectively. The two points of initiation are simultaneously detonated after the bomb penetrates the terrain; the resulting spherical propagating lines of force 213 and 214 coincide at approximately the middle of the mass 210 and form a major projection for the released energy. The energy is confined by the reactionary force 215 on the top and by the terrain on the bottom and is dispersed radially outwardly above the top of the terrain. Such dispersion is a streamlined projection travelling at terrific speeds and thus may be utilized to destroy an object adjacent the surface of the terrain.

Figures 41, 42, 43:
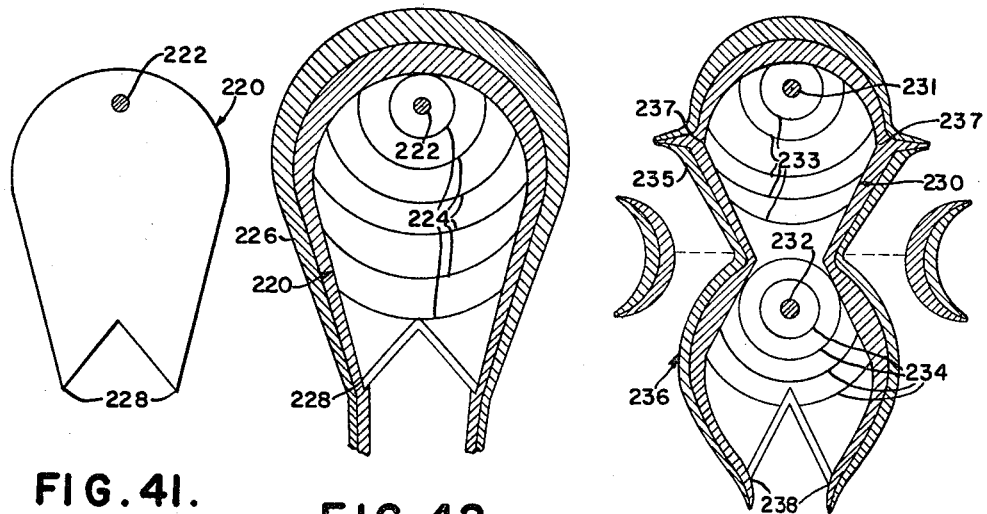
FIG. 41 is an elevation view of another form of the present invention.
FIG. 42 is a schematic representation of FIG. 41 in an exploding condition.
FIG. 43 is a schematic representation of another form of the present invention.

Another form of the present invention is illustrated in FIGURES 41 and 42 wherein a mass of explosives 220 includes a semi-spherical upper portion in registry with the base of a generally inverted cone of the lower portion. The lowermost part of the lower portion has a conical recess, the surface of which intersects the outer surface of the cone to define a surface apex 228 in the form of a circle. The point of initiation 222 is located on the vertical axis of the mass 220 and positioned just below the top surface of the upper portion. The spherical propagating lines of force 224 established an enveloping reactionary force 226 of high density at the top surface of the mass and of low density of the apex 228. Accordingly, the potential energy is released in a major projection adjacent the apex 228 and is dispersed downwardly in a circular pattern. Such an arrangement may be utilized as a super concentrated explosive mass in which the lowermost portion including the apex 228 is a metal section designed to penetrate concrete or metal.

Another form of the present invention is illustrated in FIGURE 43 wherein an explosive mass 230 includes upper and lower portions with a point of initiation, 231 and 232, for each portion. The upper portion includes a top hemisphere in registry with the base of an inverted truncated cone; the lower portion includes a truncated cone in registry with the inverted truncated cone at the truncated plane, and a lower hemisphere in registry with the base of the truncated cone. The lowermost part of the lower hemisphere has a conical recess to define an external apex 238 in the form of a circle. The surface intersection between the top hemisphere and the inverted truncated cone defines another circular apex 237. The two points of initiation are located on the vertical axis of the mass 230, the point of initiation 231 being disposed just below the top surface of the top hemisphere and the point of initiation 232 being centrally positioned in the truncated cone of the lower portion.

The two points of initiation 231 and 232 are simultaneously detonated whereby the spherical propagating lines of force 233 and 234 establish the enveloping reactionary force in upper and lower sections 235 and 236, respectively. With such an arrangement the potential energy is released in two major projections, one adjacent the apex 237 and the other adjacent the apex 238. Thus the potential energy is dispersed in a horizontally circular pattern and in a vertically circular pattern relative to the vertical axis of the mass 230.

Figure 44:
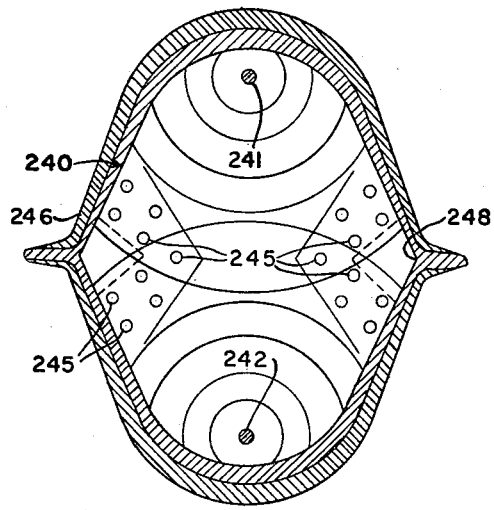
FIG. 44 is a schematic representation of another form of the present invention.

Another form of the present invention is illustrated in FIGURE 44 wherein an explosive mass 240 is formed by upper and lower conical portions joined at their bases and having rounded ends. Simultaneously detonated upper and lower points of initiation 241 and 242 are located on the vertical axis of the mass 240 and are positioned just below and just above the upper and lower rounded ends, respectively. The center periphery of the mass 240 includes propellants in the form of a plurality of pellets 245. The propellants 245 are heated and expelled along with the major projection of the released energy which is dispersed radially outwardly relative to the mass 240 because of the external apex 248 defined by the intersection between the upper and lower portions. Such an arrangement has particular use as an antipersonnel explosive in ground warfare.

Figure 45:
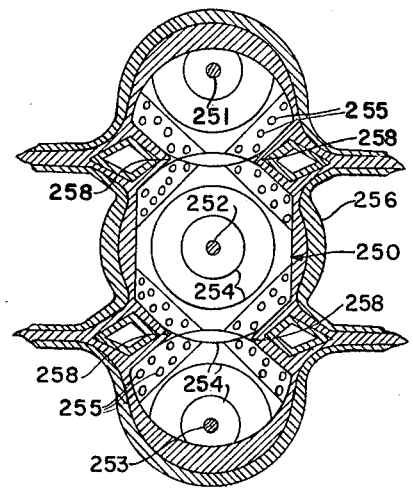
FIG. 45 is a schematic representation of another form of the present invention.

FIGURE 45 illustrates another form of the present invention in which an explosive mass 250 has an upper portion, a middle portion and a lower portion, three respective points of initiation 251, 252, 253 being respectively disposed therein along the longitudinal axis. The middle portion is a cylinder having its ends closed by the upper and lower portions which are hemispheres. Adjacent its ends the cylinder is provided with peripheral triangular recesses which define upper and lower apexes 258 in the form of spaced annuli. Three sets of spherical propagating lines of force radiate respectively from the three points of initiation and coincide adjacent the apexes 258 to increase the intensity of the energy released therefrom. Adjacent the apexes 258 the peripheral portions of the mass includes a plurality of propellants 255 which are heated and expelled along with the twin spaced projections of the released energy that is dispersed radially outwardly relative to the mass 250. Such an arrangement has particular use in rockets and guided missiles.

Figure 46:
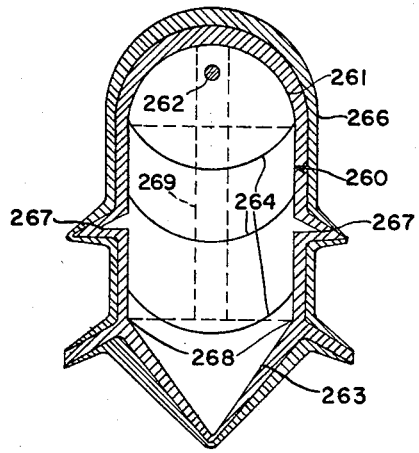
FIG. 46 is a schematic representation of another form of the present invention; and, FIG. 47 is a schematic representation of another form of the present invention.

Another form of the present invention is illustrated in FIGURE 46 wherein an explosive mass 260 has an upper portion 261 and lever portion 263 formed of different explosive compositions having different rates of expansion, such as amatol for upper portion 261 and pentolite for the lower portion 263. The upper portion has the configuration of a cylindrical part and a hemispherical part joined to one end of the cylinder. The lower portion has the configuration of an inverted cone, the base of which is joined to the other end of the cylinder. The point of initiation 262 is loctaed on the vertical axis of the mass 260 and positioned just below the top surface of upper portion 261 so that the spherical propagating lines of force 264 progresses from the upper amatol portion 261 to the lower pentolite portion 263. Intermediate its end portions, the mass 260 is provided with a peripheral angular projection 267 which is designed to deflect the energy by penetration of the reactionary force 266 before the spherical propagating lines of force reach the higher rate of explosive, i.e., the lower pentolite portion 263. This angular projection defines a surface apex 267 in the form of a circle. A lower surface apex 268 in the form of a circle is defined by the surface intersection between the base of the lower pyramid portion 263 and the adjoining surface of the cylinder portion.

In FIGURE 46, the faster expanding pentolite results in a larger magnitude for the reactionary force 266 adjacent the lower portion 263 than adjacent the cylinder portion of the upper portion 261 having the slower expanding amatol. Thus, the energy is released in a major projection adjacent the apex 268 and is dispersed downwardly in the form of a hollow, inverted cone. Energy is also released in a minor projection adjacent the surface apex 267 and is dispersed radially outward relative to the vertical axis of the mass 260. The same results could be accomplished by removing the lower pentolite section 263 and installing a core of pentolite 269 in center of the mass 260 as is illustrated in dashed lines in FIGURE 46.

Figure 47:
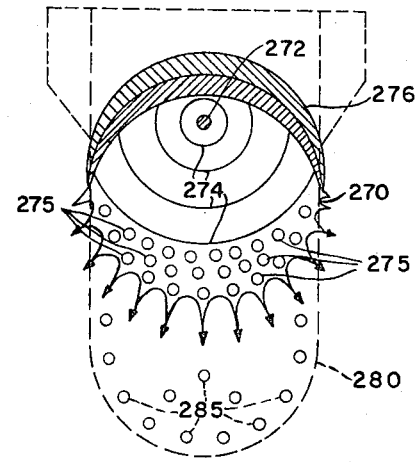

Another form of the present invention is illustrated in FIGURE 47 wherein an explosive mass 270 is in the shape of a sphere and the point of initiation 272 is centrally located on its vertical axis and positioned just below the top surface of the spherical mass 270. Adjacent its periphery the lower portion of the spherical mass 270 is provided with a plurality of propellants 275. Since the point of initiation is closer to the top surface of the spherical mass 270, the propagating lines of force concentrate adjacent such surface so that the reactionary force 276 is of greater duration there and is lesser on the opposite bottom surface where penetration occurs. Thus, the propellants 275 are heated and expelled spherically, relative to the point of initiation 272, with the energy released in a dispersion pattern conforming to the such bottom surface in the direction indictaed by the arrows.

The explosive mass 270 has particular advantage as an anti-aircraft projectile and an anti-personnel projectile as well as other types of bombs using mid-air detonation. The spherical mass 270 may be enclosed with a bomb-like casing 280 shown in dashed lines in FIGURE 47. The lower part of casing 280 includes an additional plurality of propellants which will be dispersed along with the propellants 275 from the spherical mass 270.

From the foregoing description of the various forms, it is now apparent that the present invention provides means for controlling the direction of energy released by an exploding mass. Thus, such energy may be put to useful work without loss of efficiency and since its direction is controlled, the released energy may be channelled to a particular place without destruction of objects in adjacent places. Particular advantages of the present invention will be in connection with the work to to be performed by the released energy, such as a booster for ram propelled rockets, missile and rocket propulsion, a booster for aircraft take-offs, etc.

Inasmuch as the present invention is subject to many more modifications and various changes in details, it is intended that all matter contained in the foregoing description of the various modifications and shown on the accompanying drawings shall be interpreted as illustrative and not in a limiting sense.

What is claimed is:

1. Means for controlling the direction of energy released by an explosive comprising an explosive mass, detonating means operatively disposed in said mass to define a point of initiation from which spherical propagating lines of force radiate upon detonation whereby a reactionary force envelopes said mass and confines energy released therefrom, an external surface of predetermined shape for said mass, said external surface determining the magnitude and duration of the reactionary force in accordance with the degree of conformity of said external surface to the spherical propagating lines of force whereby the confined energy penetrates the reactionary force adjacent said external surface which least conforms to the spherical propagating lines of force, a selective position for said point of initiation in said mass selecting the degree of conformity between said external surface and the spherical propagating lines of force whereby the reactionary force is selectively penetrated to control the direction of the energy released therethrough, wherein said mass includes a conical portion having a semi-spherical portion based on one end and having an oppositely dispersed conical recess in the opposite end aligned on a longitudinal axis, said external surface being provided with an apex defined by surface intersection between surfaces of the conical portion and the conical recess, and said point of initiation is located on the longitudinal axis adjacent the surface of the semi-spherical portion whereby energy penetrates the reactionary force adjacent said apex and is dispersed therefrom in an annular pattern.

2. In a device for releasing energy by detonation, the combination comprising an explosive mass, an external surface of predetermined shape confining said mass, detonating means operatively disposed in said mass to define a point of initiation from which spherical propagating lines of force radiate upon detonation to pierce said surface and establish a reactionary force, the reactionary force enveloping and restraining potential energy released by explosion of said mass, said external surface determining magnitude and duration of the reactionary force in accordance with the tangency of said external surface relative to the spherical propagating lines of force, the reactionary force being vulnerable adjacent said external surface at positions of least tangency relative to the spherical propagating lines of force, said point of initiation being selectively positioned in said mass and selecting degrees of tangency of said external surface relative to the spherical propagating lines of force whereby vulnerable positions of the reactionary force are predetermined, and the reactionary force being penetrated by the restrained potential energy at such vulnerable positions whereby the energy released therethrough is directionally controlled, wherein said mass includes a conical portion having a semi-spherical portion based on one end and having an oppositely dispersed conical recess in the opposite end aligned on a longitudinal axis, said external surface being provided with an apex defined by surface intersection between surfaces of the conical portion and the conical recess, and said point of initiation is located on the longitudinal axis adjacent the surface of the semi-spherical portion whereby energy penetrates the reactionary force adjacent said apex and is dispersed therefrom in an annular pattern.

References Cited by the Examiner

UNITED STATES PATENTS

| | | | |
|---|---|---|---|
| 2,605,704 | 8/1952 | Dumas | 102—24 |
| 2,628,559 | 2/1953 | Jasse | 102—24 |
| 2,856,850 | 10/1958 | Church | 102—24 |

FOREIGN PATENTS

| | | |
|---|---|---|
| 1,036,037 | 4/1953 | France. |

BENJAMIN A. BORCHELT, *Primary Examiner.*

SAMUEL FEINBERG, *Examiner.*

R. F. STAHL, *Assistant Examiner.*